June 21, 1960  I. J. MARRIAGE  2,941,604
BLADE STRUCTURE FOR AIRPLANE PROPELLERS
Filed Nov. 5, 1956  4 Sheets-Sheet 1

INVENTOR.
Ira J. Marriage.
BY
ATTORNEYS.

June 21, 1960     I. J. MARRIAGE     2,941,604
BLADE STRUCTURE FOR AIRPLANE PROPELLERS
Filed Nov. 5, 1956     4 Sheets-Sheet 2
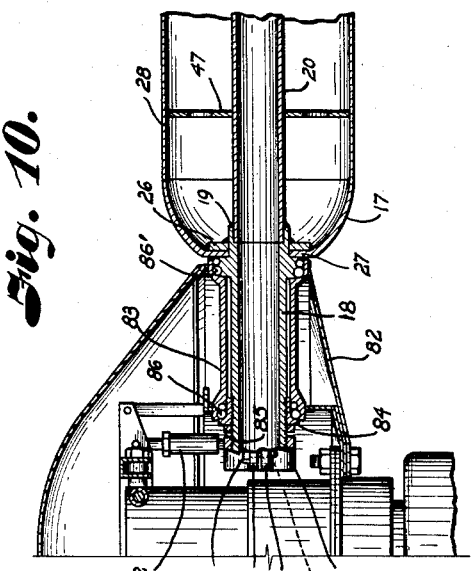
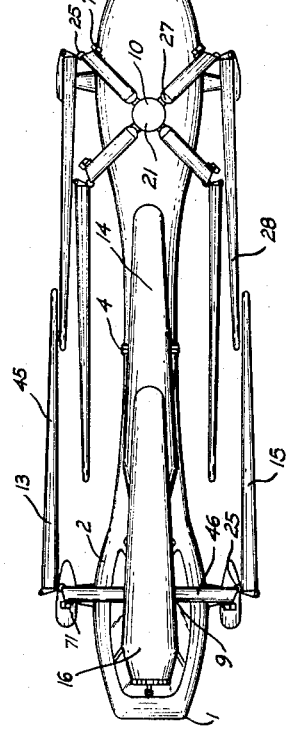
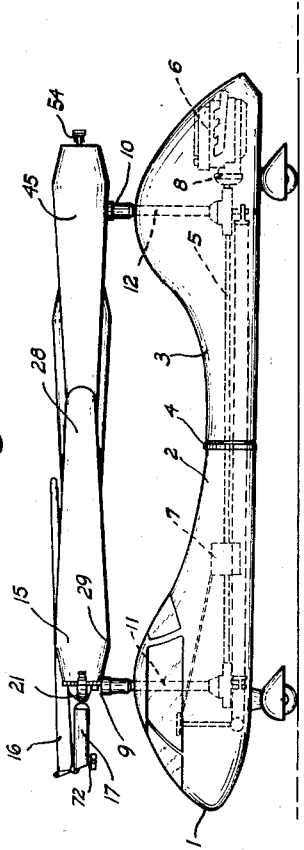
INVENTOR.
Ira J. Marriage.
BY
*Fishburn & Gold*
ATTORNEYS.

June 21, 1960 I. J. MARRIAGE 2,941,604
BLADE STRUCTURE FOR AIRPLANE PROPELLERS
Filed Nov. 5, 1956 4 Sheets-Sheet 3
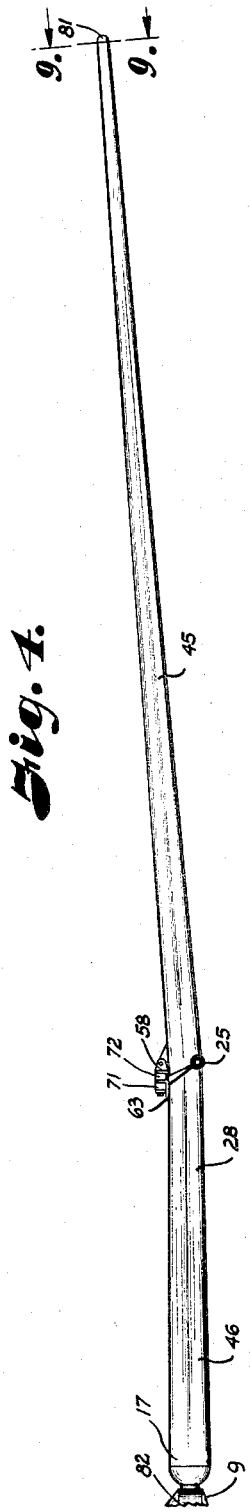
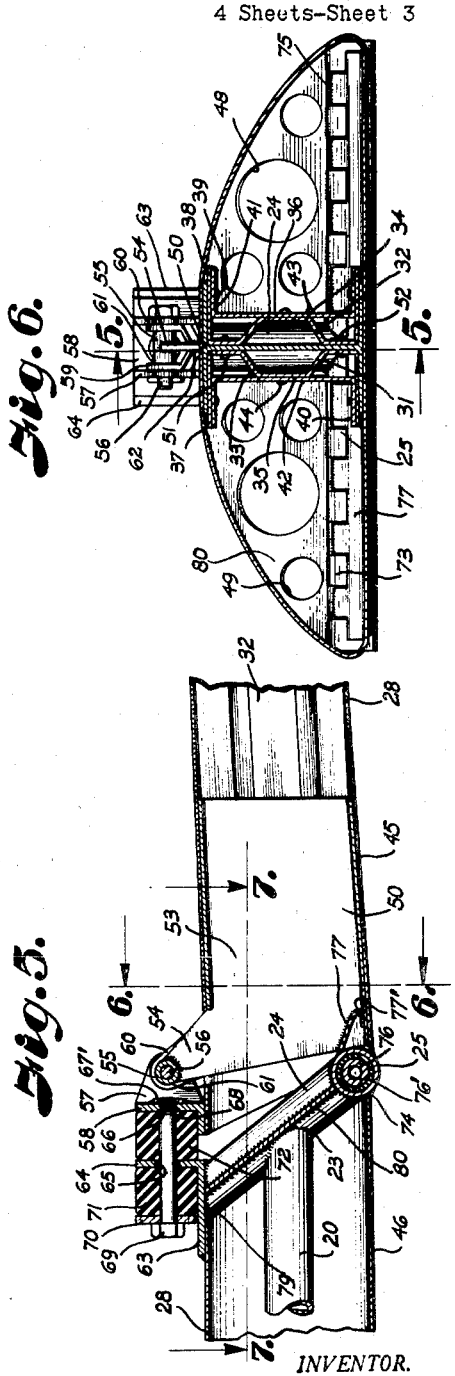
INVENTOR.
Ira J. Marriage.
BY
ATTORNEYS

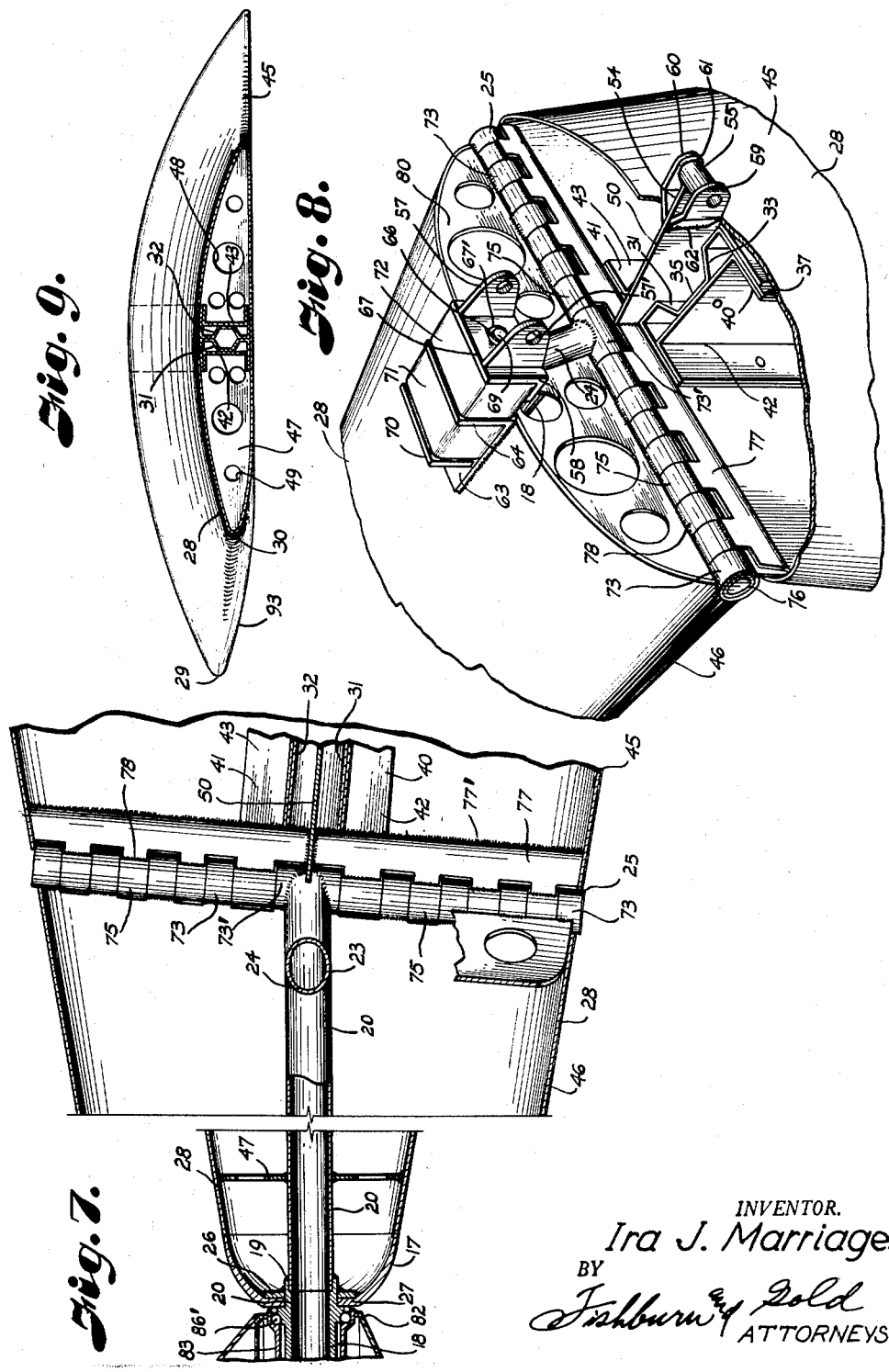

United States Patent Office 2,941,604
Patented June 21, 1960

2,941,604

BLADE STRUCTURE FOR AIRPLANE PROPELLERS

Ira J. Marriage, 4520 State, Kansas City, Kans.

Filed Nov. 5, 1956, Ser. No. 620,561

4 Claims. (Cl. 170—159)

This invention relates to improvements in aircraft propellers, and more particularly to the blade structure for such propellers.

The type of propeller blade herein illustrated is particularly adapted for aircraft of helicopter type wherein the blades are usually of quite some length and are likely to bend during operation due to the stresses placed thereon.

The principal object of the present invention is to provide blades for propellers of aircraft of helicopter type of strong and rigid construction and hinged near the base of such blades and provided with means for taking the thrust of stresses during operation to prevent undue bending of the blades.

Other objects of the present invention are to provide a hinge for the wing structure whereby the blade may be conveniently folded upon itself to form a compact structure for storing the aircraft or entering a hangar or the like for repairs; to provide resilient means in association with the hinged portion of the blade to absorb shocks and stresses in flight without the need of flexibility in the blade structure to absorb said stresses placed on the blades through operation thereof; to provide a truss construction for the blades having transverse ribs or struts to reinforce the blades to prevent undue bending thereof; to provide a metal covering for the truss construction of the blade to serve both as structural bracing and covering; and to provide blades of this character simple and economical to manufacture.

A still further object of the invention is to attach the hinge at an angle transversely of the blade for better resisting of an upward thrust with the aid of centrifugal force on the blade with respect to its hinged connection with the inner section of the blade during operation, and to resist stresses of air on the blades as the aircraft is being propelled through the air.

In accomplishing these and other objects of my invention I have provided improved details of structure the preferred forms of which are illustrated in the accompanying drawings, wherein:

Fig. 2 is a plan view of the aircraft with part of the blades in folded position.

Fig. 3 is a side view showing the fuselage section of a helicopter with the blades in folded position and the driving mechanism in dotted lines.

Fig. 4 is a side view of a blade of a propeller.

Fig. 5 is an enlarged longitudinal cross-section particularly illustrating the hinge of the blade taken on a line 5—5, Fig. 6.

Fig. 6 is a cross-sectional view taken on a line 6—6, Fig. 5.

Fig. 7 is an enlarged fragmentary cross-sectional view particularly illustrating the hinge of the blade taken on a line 7—7, Fig. 5.

Fig. 8 is a fragmentary perspective view of the hinged blade shown in partly folded position.

Fig. 9 is a transverse cross-sectional view through the blade structure taken on a line 9—9, Fig. 4.

Fig. 10 is a fragmentary sectional view through the shank of the blade showing its connection to the propeller head and illustrating the structure for turning the blade on its longitudinal axis for folding.

Figure 1:
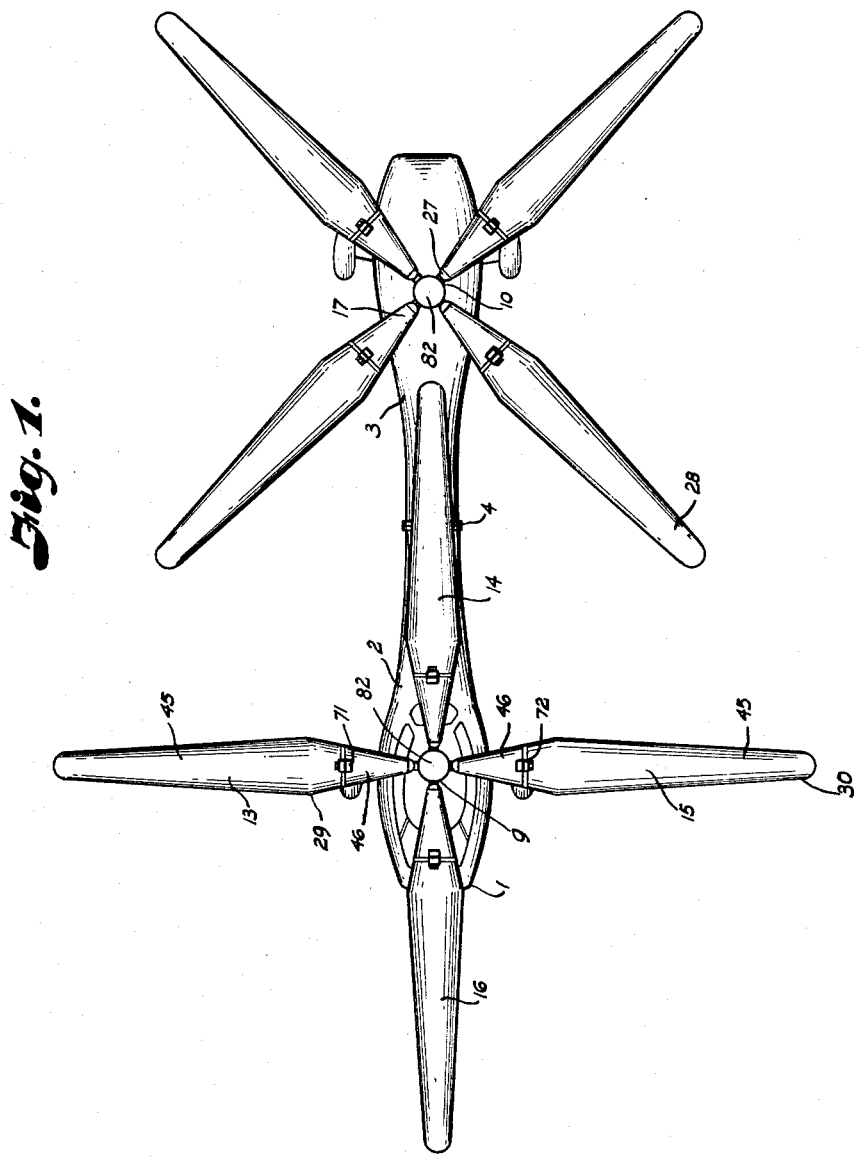
Fig. 1 is a top plan view showing the features of my invention adapted for use on a helicopter aircraft.

Referring more in detail to the drawings:

1 designates an aircraft embodying the features of my invention comprising a fuselage having a front section 2 and a rear section 3 rotatably secured together at substantially the center of the fuselage as indicated at 4. A drive shaft 5 extends longitudinally of the fuselage and a motor 6 is mounted in the rear section 3 and the control mechanism in the front section 2. A gear box as indicated at 7 is also shown as is the usual practice. The motor 6 includes the usual clutch mechanism 8 for transmitting power to the propulsion elements which are identical in detail except for being right and left, and the driving power is applied oppositely to each propeller for driving the same. The description herein will refer to the blades of the propellers 9 and 10 but only one propeller will be referred to as they are identical in construction with the above exception and are driven from the main drive shaft 5 by vertical shafts 11 and 12 as is the usual practice.

The propellers 9 and 10 are provided with a plurality of blades 13, 14, 15 and 16, although any number of blades may be used without departing from the spirit of my invention.

The shank end 18 of the base section 17 of the blade is threaded on its outer end for reasons later described, and it extends longitudinally through the inner center portion of said base section and is secured thereto by welding or the like. The inner extension 20 of said tubular shank is of lighter stock and is rigidly secured at its source by welding or other suitable means as indicated at 19 and is welded at its extended end to a supporting member 24 of a hinge 25, also later described. The tilting mechanism and other structures in connection therewith are shown and described in my co-pending application, Serial No. 620,396, filed November 5, 1956. The shank extension 20 extends longitudinally of the blades and is rigidly secured by welding or other suitable means as indicated at 23 to a supporting member 24 of a hinge 25, also later described.

Rigidly mounted upon the end of the shank 18 is a lateral flange 26 adapted to secure the cap like end 27 of a blade covering material 28 thereto. The covering material is preferably of very tough metal or any material of light weight which will withstand strains and stresses.

Each blade is inclined or tapered outwardly from the base as indicated at 29 to slightly past the hinge portion 25 as best illustrated in Fig. 1 and then the blades are tapered inwardly or in the opposite direction as indicated at 30 and as illustrated in Fig. 9. Extending longitudinally through the center of the blade from the hinge 25 to the outer end of the blade is a truss mechanism comprising two oppositely facing strut members 31 and 32 having outwardly offset portions 33 and 34 at the center thereof forming parallel sides as indicated at 35 and 36. The respective ends of the strut members are turned laterally forming flanges 37 and 38. At the top and bottom and secured thereto by rivets or the like 39 are flanges 40 and 41 of U-shaped strut members 42 and 43 having their sides engaging against the sides 35 and 36 of the strut members 31 and 32 and secured together by rivets or the like as indicated at 44. The covering 28 extends over the entire surface of the blades but is in two sections 45 and 46 because of hinging of the sections together. The covering may be secured to the strut elements by rivets or the like as is the usual practice.

Spaced transverse ribs 47 are provided throughout the length of the blade and are here shown to be perforated as indicated at 48 and 49 to lessen the weight of the structure.

Referring to the specific hinge structure of the sections 45 and 46 of the blade, I have provided an H-beam strut 50 in the inner end of the section 45 engaging between the strut structures 31 and 32 at their upper and lower vertical sides and said H-beam is secured thereto by rivets or the like as indicated at 51 and 52 (Fig. 6). The upper and lower horizontal portions of the H-beam are in engagement with the upper and lower covering 28 of the blade section 45 and suitably connected thereto and said H-beam extends partly into the blade section as shown in Fig. 5. The inner and upper end of the web portion 53 of the H-beam has an extension providing an arm 54 to which is secured by welding or other suitable means a bearing sleeve 55 for receiving a pin 56 for pivotally mounting the ears 57 of an angle-shaped bracket member 58. The bearing member 55 has additional brace arms 59 and 60 rigidly secured to each end of the bearing member as at 61 and then bent downwardly and inwardly with the lower end of the brace arms 59 and 60 welded to the sides of the arm 54 as at 62 to form a rigid structure.

Welded or otherwise suitably secured to the end of the section 46 of the blade on the side opposite the hinge proper is an angle-shaped bracket 63 of substantially the same width as the pivoted bracket 58. The vertical side portion 64 of the bracket 63 is provided with an opening 65 in alignment with a threaded opening 66 in the vertical side 67 of the bracket 58. Welded to the outer side of the vertical portion 67 is a plate or nut 67' through which the threaded opening 66 extends for additional strength of the side 67. The openings 65 and 66 in the sides 64 and 67 are adapted to receive the threaded shank 68 of a stud bolt 69. A plate 70 is provided for the head of the bolt 69, and adapted to engage between said washer 70 and the vertical side 64 of bracket 63 is a resilient member 71. A resilient member 72 is also provided between the upstanding side 64 and the side 67 of the bracket member 58. The resilient members are centrally bored in alignment with the openings 65 and 66 for receiving the shank of the bolt 69.

The hinge 25 is composed of a plurality of spaced brackets or ring members 73 welded as indicated at 74 to the lower and outer side of the section 46 and spaced brackets or ring member 75 are welded or otherwise suitably secured to the lower and inner side of the section 45. The brackets on one section engage between the brackets on the other section as illustrated in Figs. 7 and 8 and are secured together by a tubular pin 76, the brackets forming a bearing for the pin. I also provide a bearing 76' of hard rubber or like material around the pin 76 to prevent undue wear of the hinge.

In order to form a more rigid structure a strut member 77 is welded to the web of the H-beam strut 50 and also to the lower and inner end of the section 45 of the blade as illustrated at 77'. The free end of the strut member 77 is also suitably secured by welding or the like to the bracket members 75 as illustrated at 78 (Figs. 7 and 8). Welded to the center bracket 73' is a tubular frame member or hinge support 24 extending upwardly and inwardly through the upper and outer portion of the section 46 and has its other end rigidly secured by welding or the like to the angle or bracket member 63 as indicated at 79 (Fig. 5).

A transverse rib 80 is welded to each side of the tubular member 24 and has its lower end secured to the brackets 73 and its upper end to the covering 28 of the section 46 and lower portion of the angle member 63, to form also here a rigid structure.

In Fig. 10 I have illustrated a part of the propeller head at 82 to which the blades 13, 14, 15 and 16 are attached and the cylindrical head and connecting elements for changing pitch of the blades are described and illustrated in my co-pending application. The shank 18 is mounted within a sleeve 83 and threadedly secured therein by a threaded collar or nut 84 engaging the threaded end 85 of the tubular shank 18 having ball bearings 86 cooperating with the sleeve 83, which, together with ball bearings 22 compensate for the centrifugal force of the blades during operation thereof. An internally threaded split collar 87 engages the inner end of the threaded end 84 of the tubular shaft 20 of the propeller blade to hold rigidly to the shank and provide connection with the pitch mechanism. The collar has ears 88 and 89 provided with aligned openings 90, one of which is threaded to receive the threaded shank of a cap screw 91 for tightening the collar on the shank. The side of the collar opposite the ears 88 and 89 has arms (not shown) for connection of the connecting members 92 for rotating the blades when the collar is tightened.

When it is desired to fold the blades, the cap screws 91 are loosened and the blades are manually rotated on the threads of the collars 87 in the bearings 22 in the propeller head until the blades are in a position as shown in Figs. 2 and 3, that is, the blades 13 and 15 are rotated in a vertical position with respect to the aircraft, and the blade 16 is turned 180 degrees until the pin 76 of the hinge 25 is on top of the blade. The cap screws are then again tightened. The blade 14 remains in its operating position since it is not to be folded (Fig. 2). The blades of propeller 10 are all rotated into a vertical position like blades 13 and 15 of propeller 9. After this is accomplished the pins 56 are disengaged from the openings 57' in the ears 57 of the angle members 58 (Fig. 8) and the sections 45 are folded over the sections 46 into a position as shown in Figs. 2 and 3 for storage or entering a small area for repairs such as a hangar. The blades are generally of quite some length and their storage has been a problem in the past. The blade structures are tapered in both width and thickness towards the outer end as particularly illustrated in Fig. 9 the extreme tip being very thin as indicated at 81.

The bottom of the blade is substantially flat for the majority of its width, but the leading edge is tapered upwardly as indicated at 93 (Fig. 9) to provide more exposed surface and better control of the blades. This necessitates the provision of right and left blades for the propellers inasmuch as the propellers are rotating in opposite direction. I have here illustrated only one blade sloped as described but it will be obvious the other blade will be the same except for the slope on the opposite edge thereof.

When the aircraft is in use the propellers rotate on their vertical shafts and as the blades rotate towards the direction of travel of the aircraft they are not subject to as much strain as the blade goes forwardly but when the blade reaches a trailing or rearward movement with respect to the vertical shaft more strains are involved and the pitch of the blades will vary due to direction of travel and lifting or lowering of the plane, thus causing great strains on the blade, and due to the length thereof the trailing motion of the blades tends to cause the blades to bend upwardly to a somewhat greater degree than when the blade is moving with the travel of the aircraft. When the strains are placed upon the blades and resilient members 71 and 72, upward thrust compresses the resilient member 72 when the blades move against traveling direction, centrifugal power of blades compress resilient member 71 particularly when blades move with traveling direction allowing a constant play. This arrangement allows a cheaper and more rigid structure of blade, while others have to be more bendable. There is some space between the sections 45 and 46 above the hinge 25 to allow for compressing of the resilient members (Fig. 4). The resilient members are preferably made of rubber of sufficient hardness to prevent undue movement of the blade but enough to prevent breaking through strains.

It will be obvious from the foregoing that I have provided an improved blade for aircraft and particularly for aircraft of the helicopter type wherein the blades are in two sections hingedly connected together and resiliently secured one to the other to prevent undue strains and stresses and for folding for storage. The blade, being in two sections and joined by a transversely arranged hinge on the lower side and by a pliant or yieldable attachment on the top side, is allowed flexibility without going through a gradual process of metal fatigue which makes it necessary for the other type blades to be discarded after 85 hours of use. The same hinge arrangement in combination with the threaded shank and the forked collar clamp enables the blade to be conveniently folded and held up longitudinally in relation to the fuselage.

What I claim and desire to secure by Letters Patent is:

1. A blade for propellers of aircraft operable from rotary power means carried by the aircraft comprising, strut members in side by side relation longitudinally of said blades having laterally turned flanges on their upper and lower edges connected by web portions, said web portions being offset at their centers forming spaced side faces, U-shaped struts having their sides engaging the respective side faces of the strut members, means securing the U-shaped members to the web of the strut members, means securing the flanges of said strut members and said U-shaped struts together, spaced ribs transversely of said blade and secured to said longitudinal strut members, and a covering for said blade.

2. A blade for propellers of aircraft operable from rotary power means carried by the aircraft comprising, strut members in side by side relation longitudinally of said blades having laterally turned flanges on their upper and lower edges connected by web portions, said web portions being offset at their centers forming spaced side faces, U-shaped struts having their sides engaging the respective side faces of the strut members, means securing the U-shaped members to the web of the strut members, means securing the flanges of said strut members and said U-shaped struts together, spaced ribs transversely of said blade and secured to said longitudinal strut members, spaced ribs longitudinally of said blade, and a covering for said blade.

3. A blade for propellers of aircraft operable from rotary power means carried by the aircraft comprising, strut members in side by side relation longitudinally of said blades having laterally turned flanges on their upper and lower edges connected by web portions, said web portions being offset at their centers forming spaced side faces, U-shaped struts having their sides engaging the respective side faces of the strut members, means securing the U-shaped members to the web of the strut members, means securing the flanges of said strut members and said U-shaped struts together, spaced ribs transversely of said blade and secured to said longitudinal strut members, spaced ribs longitudinally of said blade, a covering for said blade, and means securing said covering to said struts and ribs.

4. A blade for propellers of aircraft operable from rotary power means carried by the aircraft comprising, a shank for attachment to said propellers, strut members in side by side relation longitudinally of said blades having laterally turned flanges on their upper and lower edges connected by web portions, said web portions being offset at their centers forming spaced side faces, means attaching said strut members to said shank, U-shaped struts having their sides engaging the respective side faces of the strut members, means securing the U-shaped members to the web of the strut members, means securing the flanges of said strut members and said U-shaped struts together, spaced ribs transversely of said blade and secured to said longitudinal strut members, spaced ribs longitudinally of said blade, a covering for said blade, and means securing said covering to said shank and to struts and ribs.

References Cited in the file of this patent

UNITED STATES PATENTS

| | | |
|---|---|---|
| 1,360,720 | Brown | Nov. 30, 1920 |
| 1,454,659 | Thurston | May 8, 1923 |
| 1,523,106 | Dornier | Jan. 13, 1925 |
| 2,014,776 | Osborn | Sept. 17, 1935 |
| 2,362,301 | Pecker | Nov. 7, 1944 |
| 2,405,777 | Buivid | Aug. 13, 1946 |
| 2,447,118 | Gluhareff | Aug. 17, 1948 |
| 2,574,980 | Meyers | Nov. 13, 1951 |
| 2,589,193 | Mayne | Mar. 11, 1952 |

FOREIGN PATENTS

| | | |
|---|---|---|
| 136,293 | Great Britain | Dec. 18, 1919 |